(12) United States Patent
Kozaki et al.

(10) Patent No.: US 6,263,356 B1
(45) Date of Patent: Jul. 17, 2001

(54) FAST FOURIER TRANSFORM CALCULATING APPARATUS AND FAST FOURIER TRANSFORM CALCULATING METHOD

(75) Inventors: Yasunari Kozaki, Tokyo; Yasunari Ikeda, Kanagawa, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/081,921

(22) Filed: May 20, 1998

(30) Foreign Application Priority Data

May 23, 1997 (JP) ............................................... P09-133380

(51) Int. Cl.[7] .................................................... G06F 15/00
(52) U.S. Cl. ........................................... 708/400; 708/404
(58) Field of Search .................................... 708/403, 404, 708/405, 406, 407, 408, 409, 400, 401, 402

(56) References Cited

U.S. PATENT DOCUMENTS

| | | | |
|---|---|---|---|
| 3,673,399 | 6/1972 | Hancke et al. ......................... | 235/156 |
| 4,138,730 | * 2/1979 | Ali ........................................ | 708/404 |
| 5,471,464 | * 11/1995 | Ikeda .................................... | 370/203 |
| 5,606,575 | 2/1997 | Williams .............................. | 375/219 |
| 5,675,572 | * 10/1997 | Hidejima et al. .................... | 370/206 |
| 5,732,113 | * 3/1998 | Schmidl et al. ...................... | 375/355 |

OTHER PUBLICATIONS

New, "Address Generation in Signal/Array Processors", I.E.E.E. Electro, vol. 8 (1983), pp. 1–5.

* cited by examiner

Primary Examiner—Chuong Dinh Ngo
(74) Attorney, Agent, or Firm—Lerner, David, Littenberg, Krumholz & Mentlik, LLP

(57) ABSTRACT

A calculating apparatus performs FFT calculation or IFFT calculation on input data and then outputs the calculated data. An input buffer memory temporarily stores the input data and outputs it to a memory. An output buffer memory temporarily stores the final data of the calculating apparatus and then outputs it to an external source. The input buffer memory or the output buffer memory is provided with an address generating circuit. The address generating circuit sets the write addresses or the read addresses of the data to be stored in either buffer memory in a predetermined order. Thus, the frequency domain of the data in the calculating apparatus is converted without requiring the use of an external circuit.

8 Claims, 16 Drawing Sheets

US 6,263,356 B1

FAST FOURIER TRANSFORM CALCULATING APPARATUS AND FAST FOURIER TRANSFORM CALCULATING METHOD

BACKGROUND OF THE INVENTION

1. Field of the Invention

The present invention broadly relates to a fast Fourier transform calculating apparatus and a fast Fourier transform calculating method. More particularly, the invention relates to a fast Fourier transform calculating apparatus and a fast Fourier transform calculating method, both of which are suitably used for performing modulation or demodulation according to an orthogonal frequency division multiplex (OFDM) method.

2. Description of the Related Art

FIG. 10 illustrates an example of a signal spectrum obtained by the OFDM method used in digital audio broadcasting (DAB). A fast Fourier transform (FFT) calculating apparatus performs demodulation in this DAB by converting input data at N points on a time axis to data at the N points on a frequency axis. On the other hand, an inverse fast Fourier transform (IFFT) calculating apparatus performs modulation in the DAB by converting input data at N points on a frequency axis to data at the N points on a time axis. When the index of each data item on the time axis ranges from 0 to (N−1), the index 0 of the data on the frequency axis corresponds to the angular frequency 0, and the index (N−1) of the data on the frequency axis corresponds to the angular frequency $2\pi (1-1/N)$. According to the above correspondence between the index of data and the angular frequency, it is specified that the frequency domain ranges from 0 to $2\pi$.

FIG. 11 illustrates the relationship between the input data and the output data of the FFT calculating apparatus in accordance with the frequency domain specified above. The FFT calculating apparatus performs FFT calculation on the data at the N points on the time axis, as indicated by the upper portion of FIG. 11, thereby outputting the data at the N points on the frequency axis, as indicated by the lower portion of FIG. 11. Strictly speaking, the frequency domain of the data at the N points on the frequency axis ranges from 0 to $2\pi (1-1/N)$. It is, however, specified to range from 0 to $2\pi$, as noted above.

Similarly, FIG. 12 illustrates the relationship between the input data and the output data of the IFFT calculating apparatus. The IFFT calculating apparatus performs IFFT calculation on the input data at the N points on the frequency axis, as indicated by the upper portion of FIG. 12, thereby outputting the data at the N points on the time axis, as indicated by the lower portion of FIG. 12. In the IFFT calculation, as well as in the above-described FFT calculation, the frequency domain of the data at the N points on the frequency axis ranges from 0 to $2\pi$.

In this manner, the frequency domain of the output data of the FFT calculating apparatus and the frequency domain of the input data of the IFFT calculating apparatus generally range from 0 to $2\pi$.

FIG. 13 illustrates an example of a signal spectrum obtained by the OFDM method used in digital video broadcasting-terrestrial (DVB-T), which is one of the digital video broadcasts. Unlike the FFT calculating apparatus and the IFFT calculating apparatus used in the foregoing DAB, in the FFT calculating apparatus and the IFFT calculating apparatus employed in this DVB-T, the frequency domain ranging from 0 to $2\pi$ of the output data of the FFT calculating apparatus and the frequency domain of the input data of the IFFT calculating apparatus are sometimes converted to a range from $-\pi$ to $\pi$.

FIG. 14 illustrates the relationship between the input data and the output data of the FFT calculating apparatus when the frequency domain ranging from 0 to $2\pi$ of the output data of the FFT calculating apparatus is converted to a range from $-\pi$ to $\pi$. The FFT calculating apparatus performs FFT calculation on the input data at the N points on the time axis, as represented by the upper portion of FIG. 14, thereby outputting the data at the N points on the frequency axis, as represented by the lower portion of FIG. 14. The frequency domain of the output data at the N points on the frequency axis ranges from $-\pi$ to $\pi$.

Likewise, FIG. 15 illustrates the relationship between the input data and the output data of the IFFT calculating apparatus when the frequency domain ranging from 0 to $2\pi$ of the input data of the IFFT calculating apparatus is converted to a range from $-\pi$ to $\pi$. The IFFT calculating apparatus performs IFFT calculation on the data at the N points in the frequency domain from $-\pi$ to $\pi$ on the frequency axis, as indicated by the upper portion of FIG. 15, thereby outputting the data at the N points on the time axis, as indicated by the lower portion of FIG. 15.

In this manner, it may be necessary to convert the frequency domain of the output data of the FFT calculating apparatus or the input data of the IFFT calculating apparatus according to the intended purpose of use. The conversion of the frequency domain ranging from 0 to $2\pi$ to the range from $-\pi$ to $\pi$ may be achieved by using the following type of circuitry. In this circuitry, data concerning the frequency domain from 0 to $2\pi$ used in the output data of the FFT calculating apparatus or the input data of the IFFT calculating apparatus is temporarily stored, and the index of the frequency domain data is sequentially shifted to a range from (N/2) to (N−1) and a range from 0 to (N/2−1), thereby outputting the resulting data. The amount of data treated in the FFT calculation or IFFT calculation is determined to be one symbol. According to the above-described shifting operation, the frequency data is rotated by an amount equivalent to a half symbol. This is referred to as "half-symbol rotation".

FIG. 16 illustrates an example of the configuration of a FFT calculating apparatus 40 provided with the above-described circuitry for converting the frequency domain. According to this configuration, input data is temporarily stored in an input buffer memory 7 and then input into a memory 4 (may be input into a butterfly calculator 3 if necessary). The butterfly calculator 3 performs butterfly calculation on the data input from the memory 4 (may be from the input buffer memory 7) by using rotation operator data supplied from a sin/cos generator 5, thereby outputting the calculated data to the memory 4 (may be to an output buffer memory 8 if necessary). The memory 4 then outputs the data calculated by the butterfly calculator 3 to the output buffer memory 8.

The output buffer memory 8 temporarily stores the final data of the FFT calculating apparatus 40 and then outputs it to a half-symbol rotator 30. At this time, the frequency domain of the output data ranges from 0 to $2\pi$. The output data is supplied to the half-symbol rotator 30, which then temporarily stores, as illustrated in FIG. 17, the data and performs half-symbol rotation on the data. Accordingly, the frequency domain ranging from 0 to $\pi$ of the output data of the output buffer memory 8 is converted to a range from $-\pi$ to $\pi$.

In an IFFT calculating apparatus 50, a half-symbol rotator 31 is provided, as shown in FIG. 18, prior to the input buffer memory 7. The input data having a frequency domain from $-\pi$ to $\pi$ is first rotated, as illustrated in FIG. 19, by an amount equal to a half symbol by the half-symbol rotator 31, and is then converted to a range from 0 to $2\pi$. The resulting data having the converted frequency domain is supplied to the IFFT calculating apparatus 50.

According to the above-described configuration of the FFT calculating apparatus 40 or the IFFT calculating apparatus 50, the frequency domain of the output data of the FFT calculating apparatus 40 or the frequency domain of the input data of the IFFT calculating apparatus 50 is converted.

In the foregoing FFT calculating apparatus or the IFFT calculating apparatus, however, the addition of an external circuit for converting the frequency domain disadvantageously increases the scale of the circuitry.

SUMMARY OF THE INVENTION

Accordingly, in view of the above background, it is an object of the present invention to convert the frequency domain for use in a FFT calculating apparatus or an IFFT calculating apparatus without needing to use an external circuit, thereby decreasing the scale of the circuitry.

In order to achieve the above object, according to one aspect of the present invention, there is provided a calculating apparatus having first storage means for storing data to be input from an external source. Calculation means performs butterfly calculation. Second storage means stores data used for the calculation of the calculation means. Third storage means stores the data calculated by the calculation means and to be output to an external source. Setting means sets the order of write addresses or read addresses of the data to be stored in the first storage means or the third storage means.

In the foregoing calculating apparatus, the first storage means or the third storage means writes or reads data in accordance with the order of addresses set by the setting means. For example, the data whose upper half symbol and lower half symbol are transposed may be input or output.

According to another aspect of the present invention, there is provided a calculating method for use in the foregoing calculating apparatus, having a setting step of setting the order of write addresses or read addresses of the data to be stored in the first storage means or the third storage means.

In the foregoing calculating method, the first storage means or the third storage means writes or reads data in accordance with the order of addresses set by the setting step. For example, the data whose upper half symbol and lower half symbol are transposed may be input or output.

DESCRIPTION OF THE PREFERRED EMBODIMENT

Figure 1:
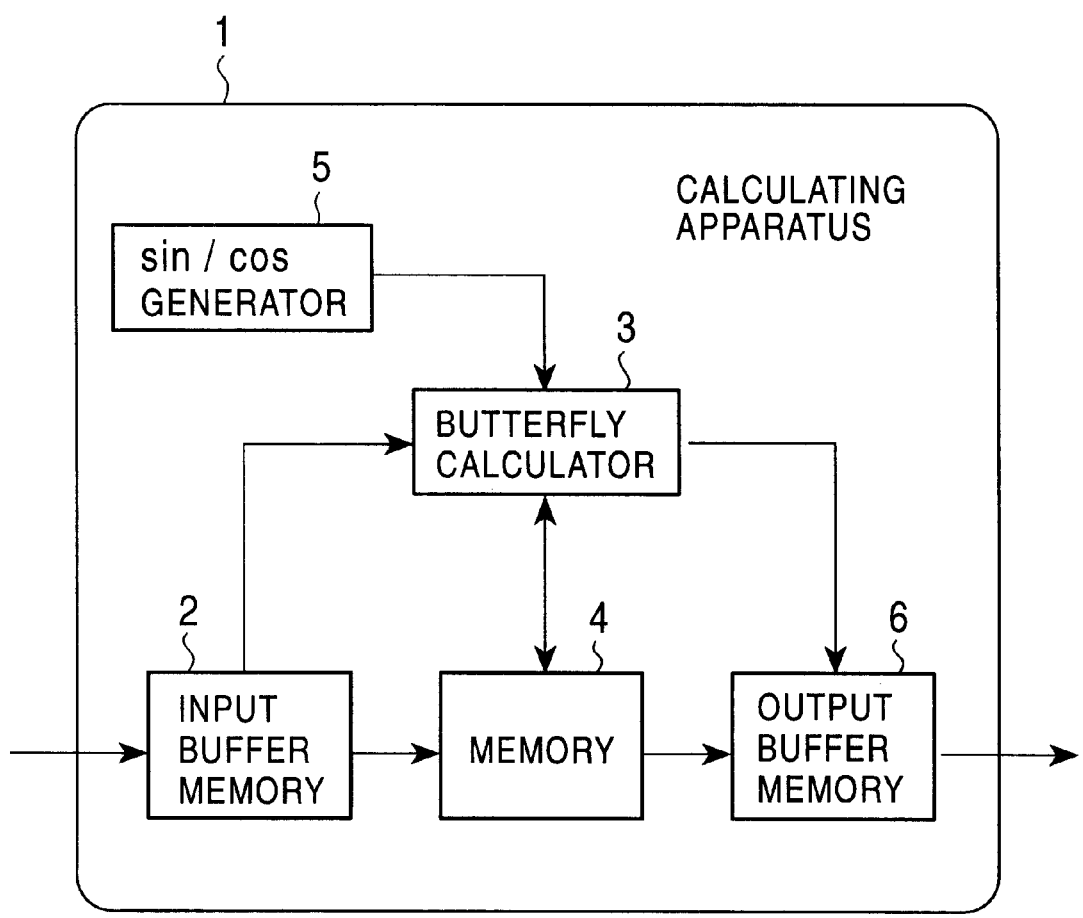
FIG. 1 is a block diagram illustrating the configuration of a calculating apparatus according to an embodiment of the present invention.
Figure 16:
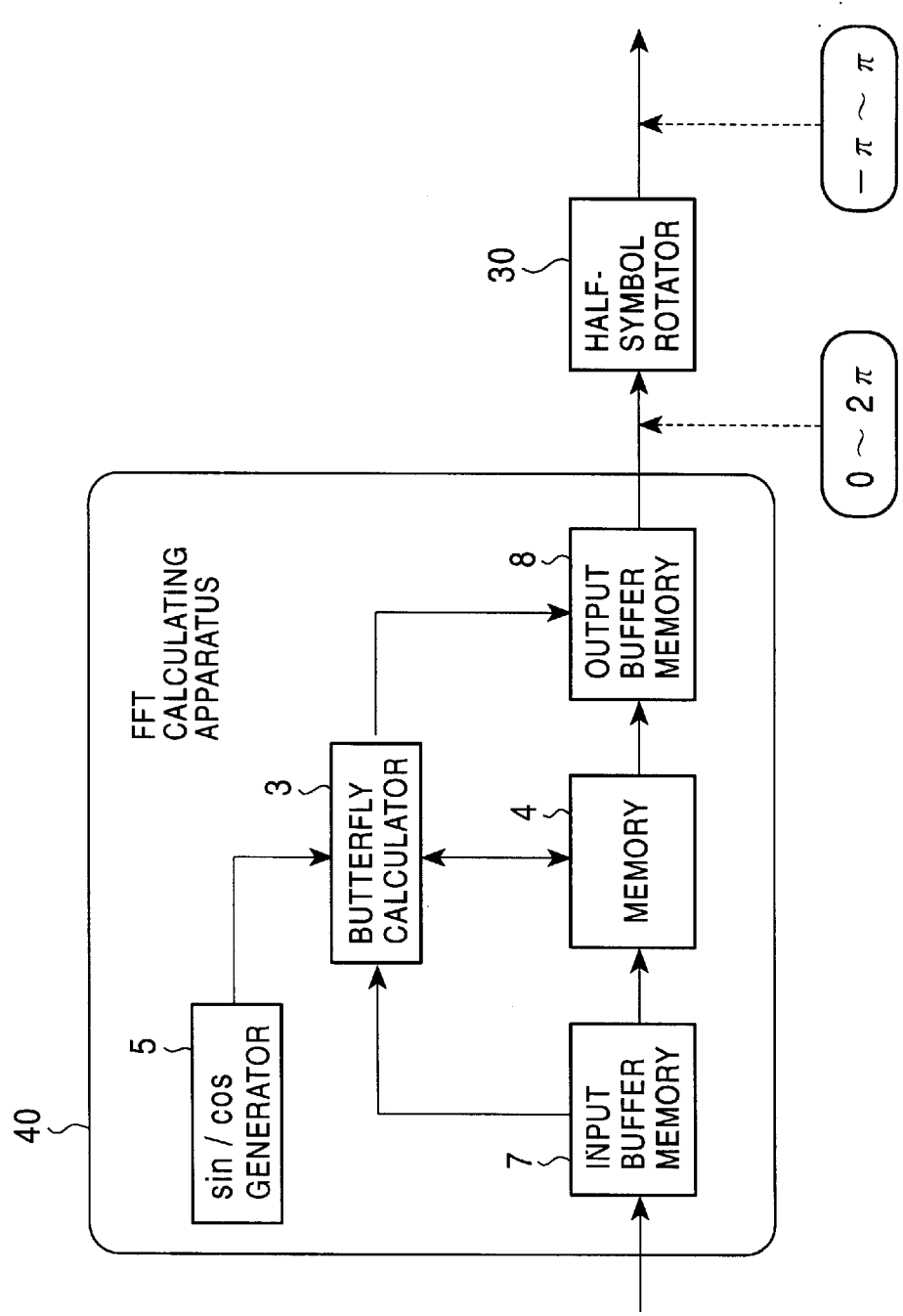
FIG. 16 is a block diagram illustrating the configuration of a known FFT calculating apparatus.
Figure 17:
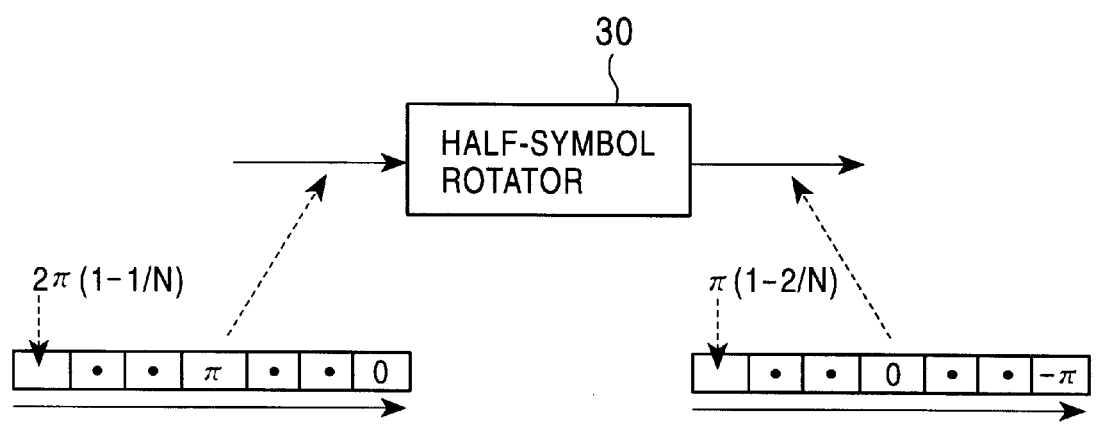
FIG. 17 illustrates the operation of a half-symbol rotator for use in the FFT calculating apparatus shown in FIG. 16.
Figure 18:
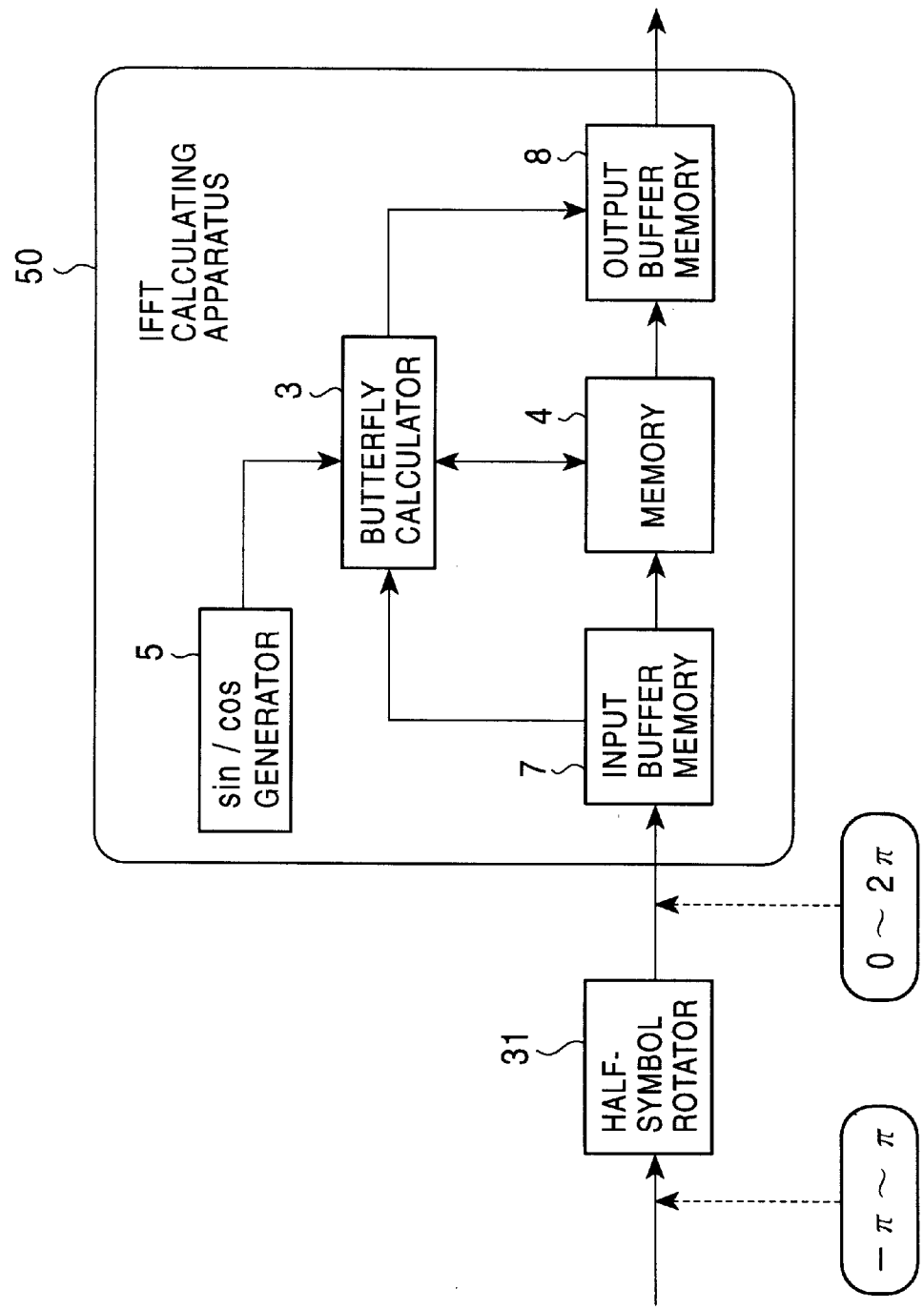
FIG. 18 is a block diagram illustrating the configuration of a known IFFT calculating apparatus.
Figure 19:
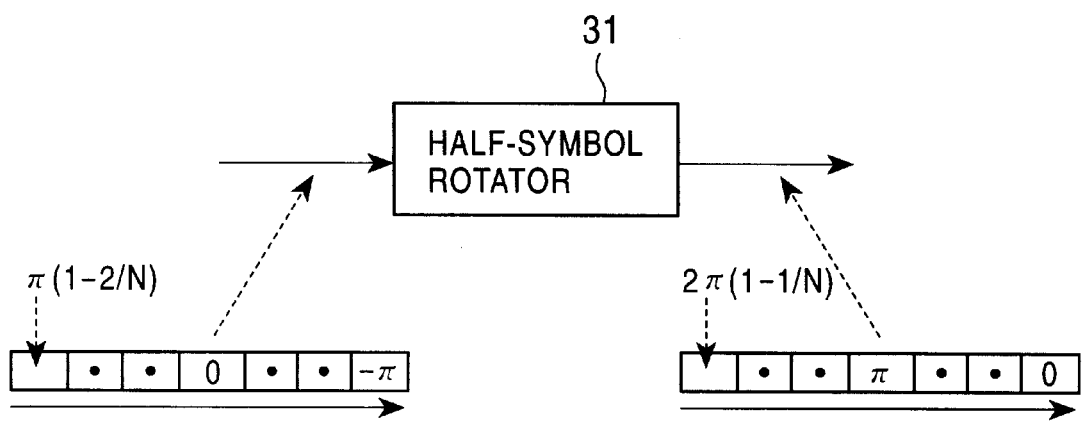
FIG. 19 illustrates the operation of a half-symbol rotator for use in the IFFT calculating apparatus shown in FIG. 18.

FIG. 1 is a block diagram illustrating the configuration of a calculating apparatus according to an embodiment of the present invention. The elements corresponding to those shown in FIGS. 16 and 18 are designated with like reference numerals, and an explanation thereof is thus appropriately omitted. According to this embodiment, a calculating apparatus 1 performs FFT calculation or IFFT calculation on input data and then outputs the calculated data. An input buffer memory 2 temporarily stores the input data and then outputs it to a memory 4 (may be to a butterfly calculator 3 if necessary). An output buffer 6 temporarily stores the final data of the calculating apparatus 1 and outputs it to an external source. The input buffer memory 2 or the output buffer memory 6 is provided with an address generating circuit 20 (which is described later in greater detail with reference to FIG. 4). The address generating circuit 20 arranges the write addresses or the read addresses of data in either buffer memory in a predetermined order.

The address generating circuit 20 may be provided only for the output buffer memory 6 if the calculating apparatus 1 performs only FFT calculation. Conversely, the address generating circuit 20 may be provided only for the input buffer memory 2 if the calculating apparatus 1 performs only IFFT calculation.

The calculation performed in the calculating apparatus 1 of this embodiment is basically similar to the FFT calculation made by the known FFT calculating apparatus 40 shown in FIG. 16 or the IFFT calculation made by the known IFFT calculating apparatus 50 shown in FIG. 18. However, the calculation of the calculating apparatus 1 differs from that of the above conventional apparatus 40 or 50 only in the operation of the input buffer memory 2 or the output buffer memory 6. Thus, primarily, a discussion is given below of the configuration and the operation of the input buffer memory 2 or the output buffer memory 6. Moreover, both the input buffer memory 2 and the output buffer memory 6 have write addresses and read addresses, both of which range from 0 to (N−1), in order to store the data at the N points.

Figure 2A:
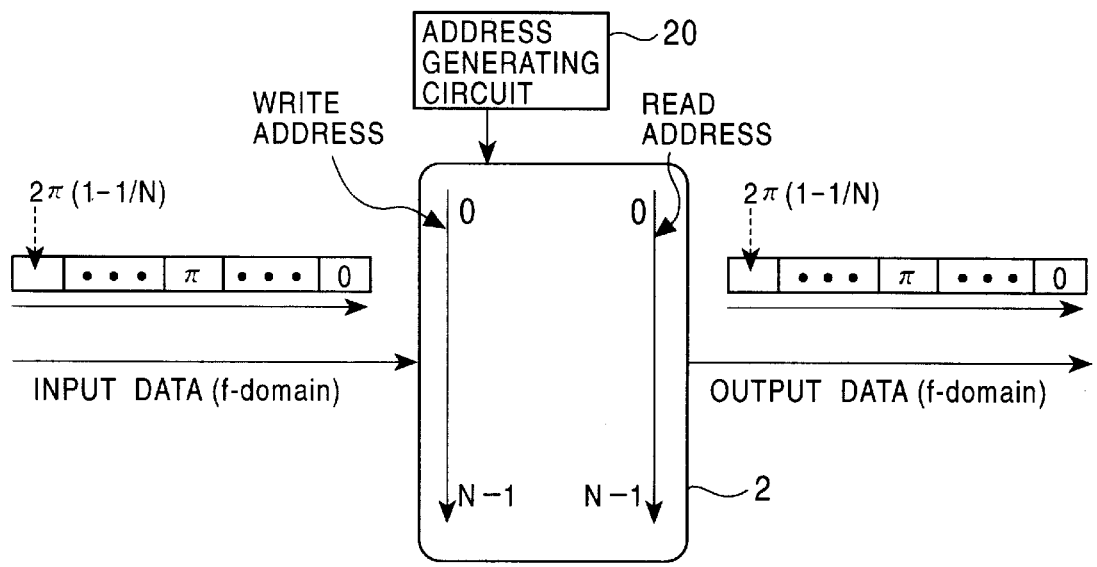
FIG. 2, which is comprised of FIGS. 2A and 2B, illustrates an example of the configuration of an input buffer memory for use in the calculating apparatus shown in FIG. 1.
Figure 2B:
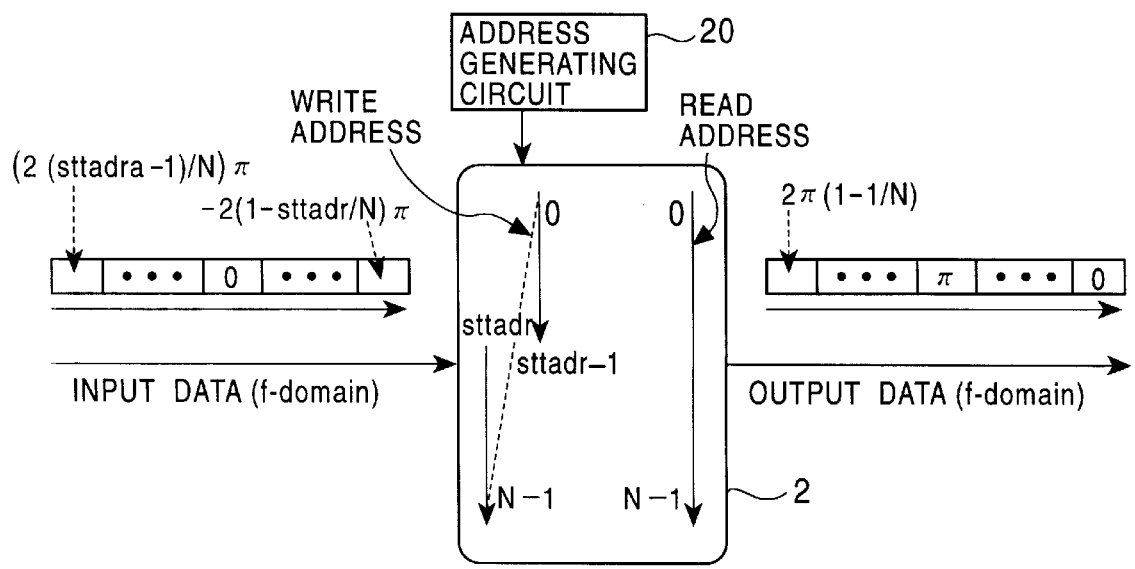

An embodiment of the input buffer memory 2 is shown in FIGS. 2A and 2B. In the input buffer memory 2 illustrated in FIG. 2A, the address generating circuit 20 (which is described later in greater detail with reference to FIG. 4) sets the order of writing data items into the input buffer memory 2 in such a manner that the data items are sequentially written into the write addresses from 0 to (N−1). In accordance with this order of write addresses, the data items at the N points having an angular frequency ranging from 0 to $2\pi$ (1−1/N) are sequentially written into the write addresses from 0 to (N−1). Then, the written data items are sequentially read from the read addresses from 0 to (N−1). Namely, the data having a frequency domain from 0 to $2\pi$ is input into the input buffer memory 2 and the data having a frequency domain from 0 to $2\pi$ is output therefrom.

In the input buffer memory 2 illustrated in FIG. 2B, the address generating circuit 20 sets the order of writing data items into the input buffer memory 2 in such a manner that the data items are sequentially written into the write addresses from (sttadr) to (N−1) and from 0 to (sttadr−1). The write address (sttadr) is determined by the frequency domain of the input data. In accordance with the above order of write addresses, the data items at the N points having an angular frequency from (−2(1−sttadr/N) $\pi$) to (2(sttadr−1)/N) $\pi$) are sequentially written into the predetermined write addresses from (sttadr) to (N−1) and then returned to the write address 0 and further to the write address (sttadr−1).

At this time, it is seen from the write addresses from 0 to (N−1) that the data items having an angular frequency ranging from 0 to ($2\pi$ (1−1/N)) are sequentially stored. The written data items are sequentially read from the read addresses from 0 to N−1. Namely, the data having a frequency domain from −$\pi$ to $\pi$ is input into the input buffer memory 2 and the data having a frequency domain from 0 to $2\pi$ is output therefrom.

According to the foregoing embodiment, it is possible to convert the frequency domain of the data input into the calculating apparatus 1 to a desired range by using the input buffer memory 2. Therefore, the provision of the half-symbol rotator 31 is made unnecessary, thereby making it possible to reduce the scale of the circuitry over the IFFT calculating apparatus 50 shown in FIG. 18.

In this embodiment, the order of write addresses is set to convert the frequency domain of the input data. However, the order of the read addresses may be set.

Figure 3A:
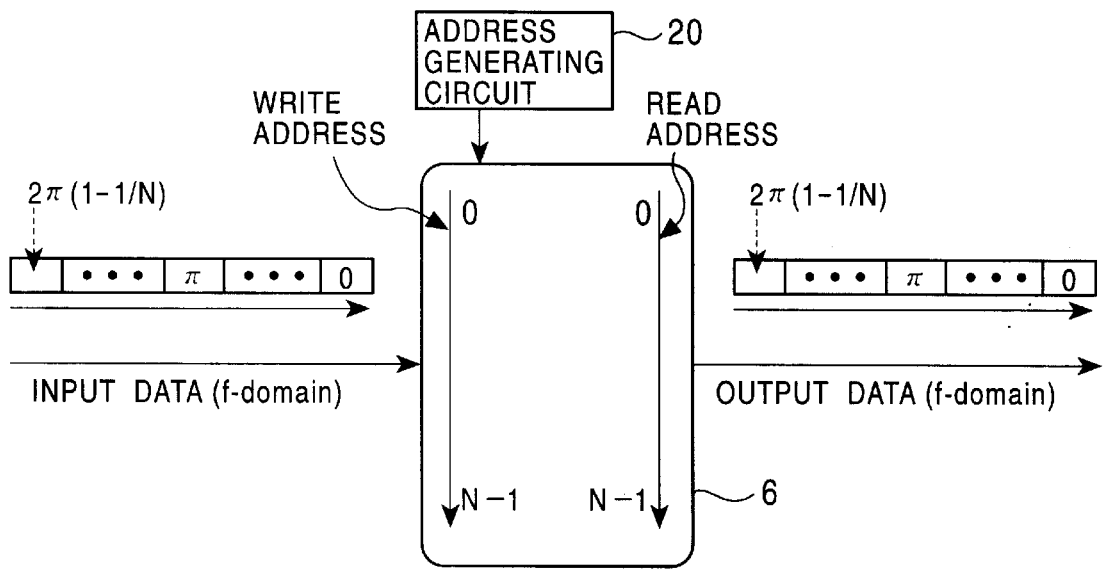
FIG. 3, which is comprised of FIGS. 3A and 3B, illustrates an example of the configuration of an output buffer memory for use in the calculating apparatus shown in FIG. 1.
Figure 3B:
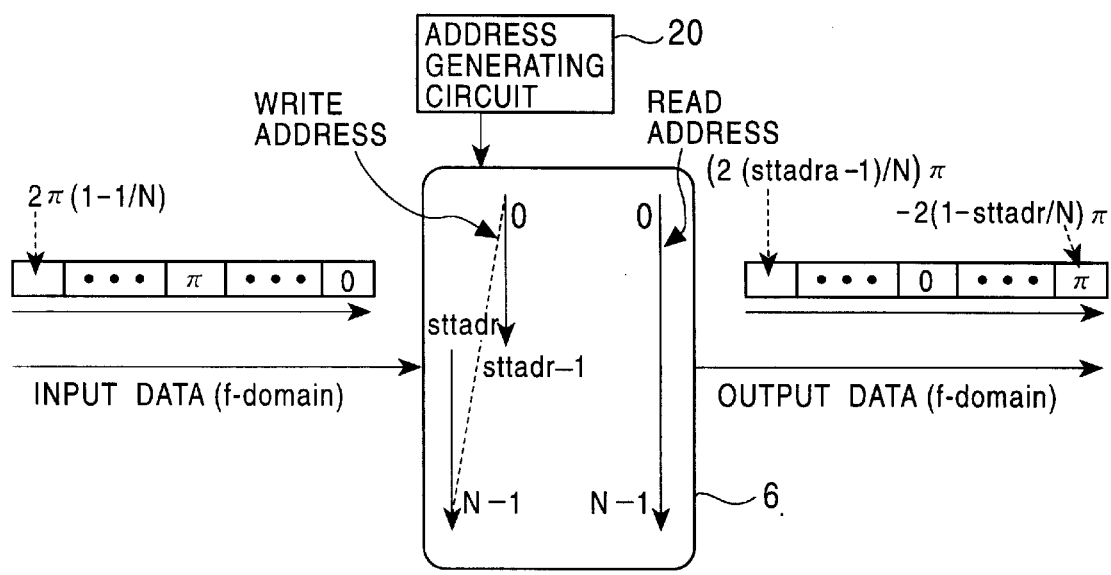

An embodiment of the output buffer memory 6 is shown in FIGS. 3A and 3B. The output buffer memory 6 illustrated in FIG. 3A is similar to the input buffer memory 2 shown in FIG. 2A, and an explanation thereof is thus appropriately omitted. In the output buffer memory 6 shown in FIG. 3B, the address generating circuit 20 sets the order of writing data items into the output buffer memory 6 in such a manner that the data items are sequentially written into the write addresses from (sttadr) to (N−1) and from 0 to (sttadr−1). The data items at the N points having an angular frequency from 0 to ($2\pi$ (1−1/N)), which are input according to the above order of write addresses, are sequentially written, as illustrated in FIG. 3B, starting from the write address (sttadr) to the address (N−1), and then returned to the address 0 and further written to the address (sttadr−1).

At this time, it is seen from the order of write addresses from 0 to (N−1) that the data items having an angular frequency from (−$2\pi$ (1−sttadr/N)) to ($2\pi$ (sttadr−1)/N) are sequentially stored. Then, the written data items are sequentially read from the addresses from 0 to N−1. Namely, the data having a frequency domain from 0 to $2\pi$ is input into the output buffer memory 6 and the data having a frequency domain from −$\pi$ to $\pi$ is output therefrom.

According to this embodiment, it is possible to set the frequency domain of the data output from the calculating apparatus 1 to a desired range by the output buffer memory 6. Accordingly, since the provision of the half-symbol rotator 30 is not required, the scale of the circuitry can be reduced over the FFT calculating apparatus 40 illustrated in FIG. 16.

In the foregoing embodiment, the order of the write addresses is set to convert the frequency domain of the output data. However, the order of read addresses may be set.

Figure 4:
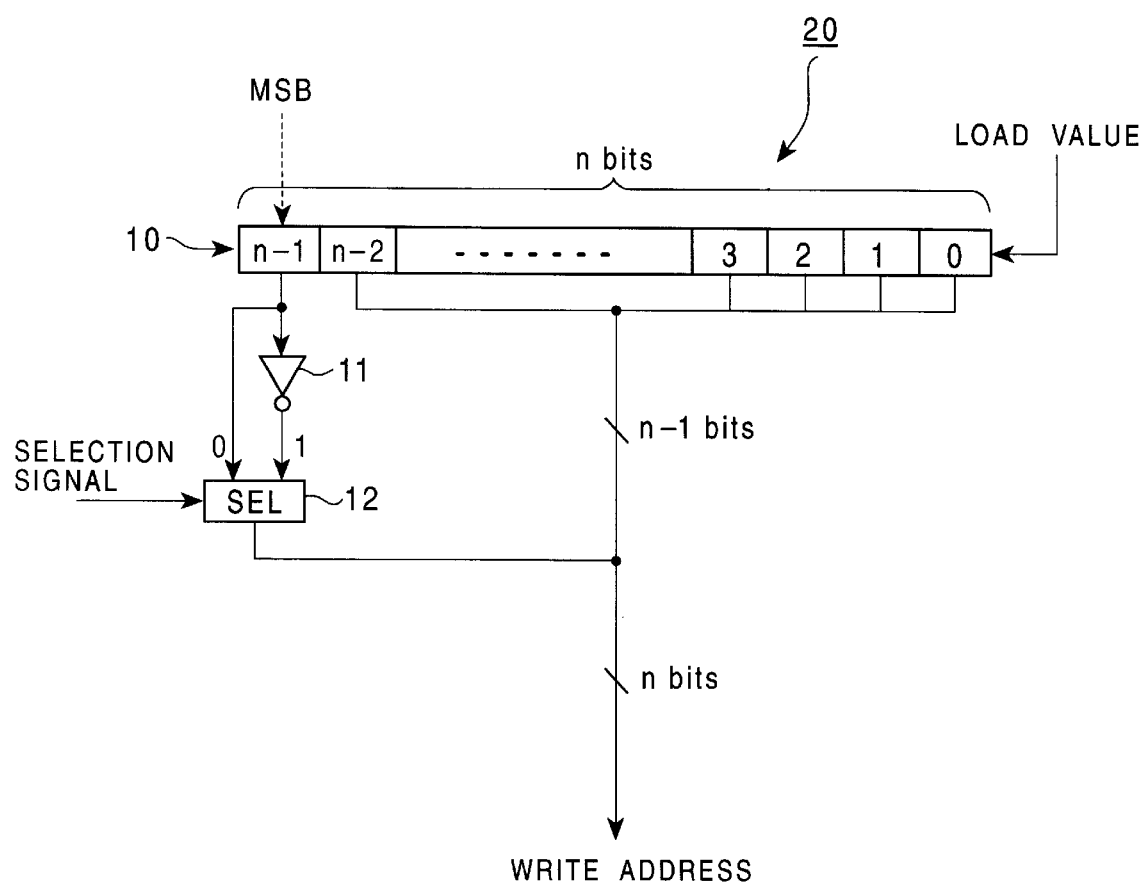
FIG. 4 illustrates the configuration of an example of an address generating circuit for use in the input buffer memory shown in FIG. 2 or the output buffer memory shown in FIG. 3.

An embodiment of the address generating circuit 20 is now described below with reference to FIG. 4. In response to a predetermined load value, an n-bit counter 10 loads the value and then starts counting in synchronization with the data input into either of the input buffer memory 2 or the output buffer memory 6. The counter 10 then divides the count level into the most significant bit (MSB) and the remaining (n−1) bits and outputs them. The MSB of the count level is supplied to a NOT circuit 11 and a selector (SEL) 12. The NOT circuit 11 inverts the MSB and then supplies it to the selector 12. The selector 12 outputs the not-inverted MSB directly supplied from the counter 10 when a selection signal transmitted from an exterior source indicates 0. In contrast, the selector 12 outputs the inverted MSB when a selection signal represents 1. Finally, output from the address generating circuit 20 is a total of n bits of the MSB (one bit) output from the selector 12 and the remaining (n−1) bits output from the counter 10.

The above-described operation is sequentially performed to set the order of write addresses in each buffer memory.

If the number of addresses N of the input buffer memory 2 or the output buffer memory 6 is determined to be $2^n$, the counter 10 is required to have a number of at least n bits. Accordingly, if the least significant bit (LSB) is set to 0 bit, the MSB of the count level is the (n−1)th bit. The same address generating circuit 20 may be for common use of the input buffer memory 2 and the output buffer memory 6.

Figure 5A:
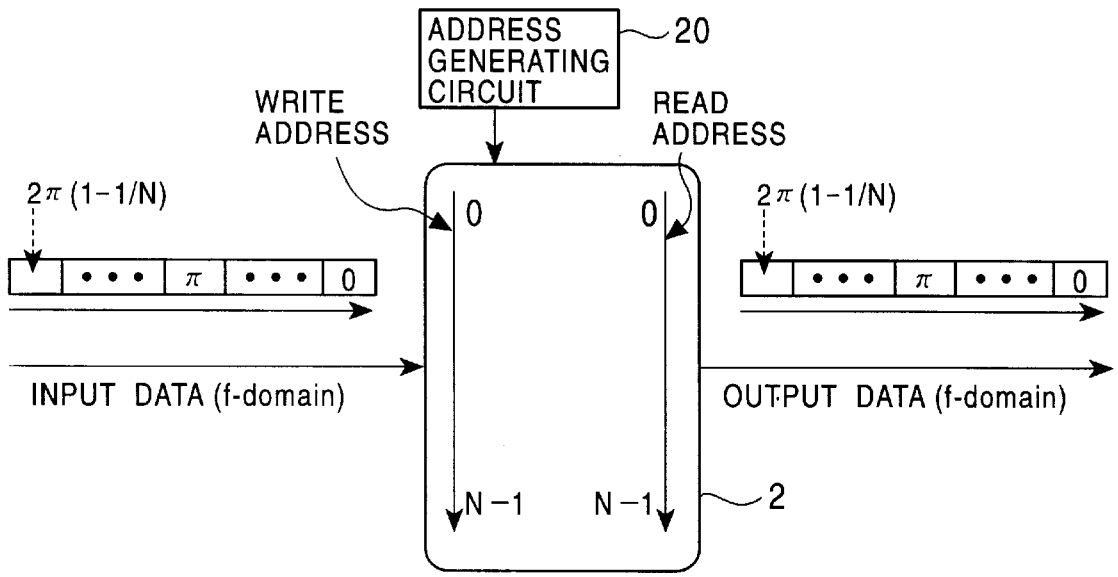
FIG. 5, which is comprised of FIGS. 5A and 5B, illustrates another example of the configuration of the input buffer memory for use in the calculating apparatus shown in FIG. 1.

The foregoing embodiments of the input buffer memory 2 and the output buffer memory 6 and the address generating circuit 20 are further described by using specific numeric values. The input buffer memory 2 and the output buffer memory 6 shown in FIGS. 5 and 6 are similarly configured to those illustrated in FIGS. 2 and 3, respectively, and an explanation thereof is thus appropriately omitted. A description is only given of the output buffer memory 6 shown in FIG. 6B.

FIG. 6B illustrates the operation of the output buffer memory 6 in which the input data having a frequency domain from 0 to π is converted to a range from −π to π. The number of addresses N is set to be 8, and the write address (sttadr) is set to be 4(=N/2). The address generating circuit 20 sets the order of writing data items into the output buffer memory 6 in such a manner that the data items are sequentially written into the addresses from 4 to 7 and from 0 to 3 (which is described in greater detail later with reference to FIG. 7). In accordance with the above order of write addresses, input data having an angular frequency from 0 to (7π/4) on eight points are written, starting from the write address 4 to the write address 7, and then returned to the write address 0 and further to the write address 3.

At this time, it is seen in the order of the write addresses from 0 to 7, the data items having an angular frequency of π, 5π/4, 6π/4, 7π/4, 0, π/4, 2π/4, and 3π/4 are sequentially stored in the output buffer memory 6. Then, the written data items are sequentially read from the read addresses from 0 to 7. According to the foregoing operation, the data having a frequency domain from 0 to 2π is input into the output buffer memory 6, and the data having a frequency domain from −π to π is output therefrom.

Figure 5B:
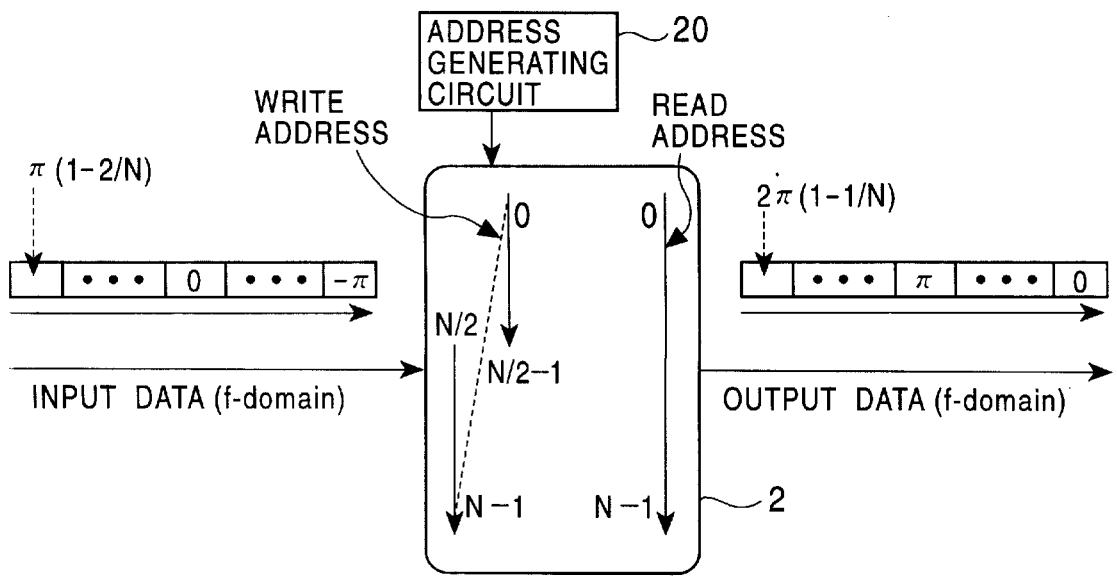
Figure 6A:
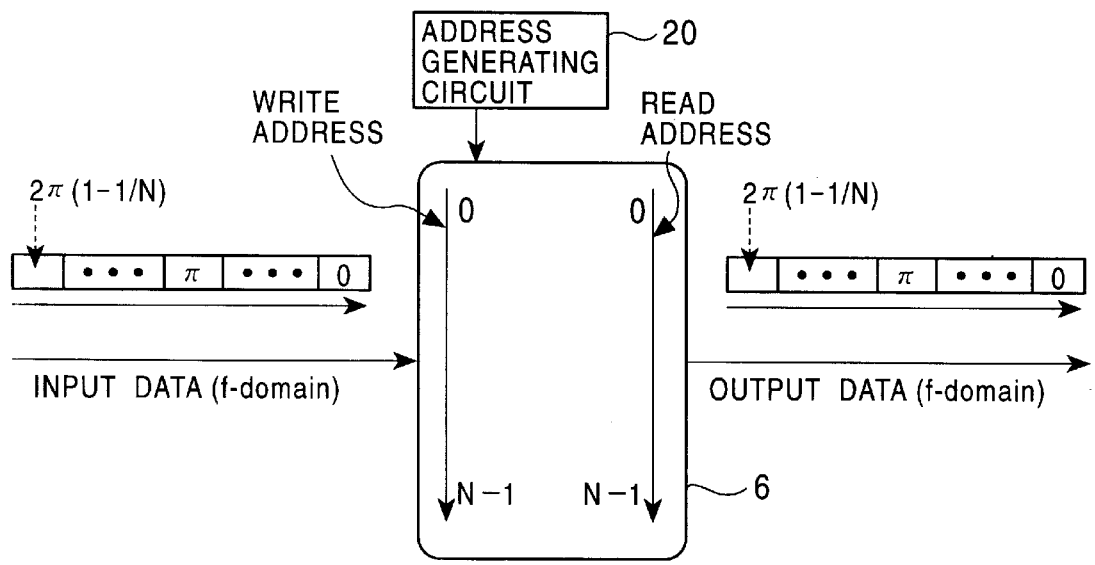
FIG. 6, which is comprised of FIGS. 6A and 6B, illustrates another example of the configuration of the output buffer memory for use in the calculating apparatus shown in FIG. 1.
Figure 6B:
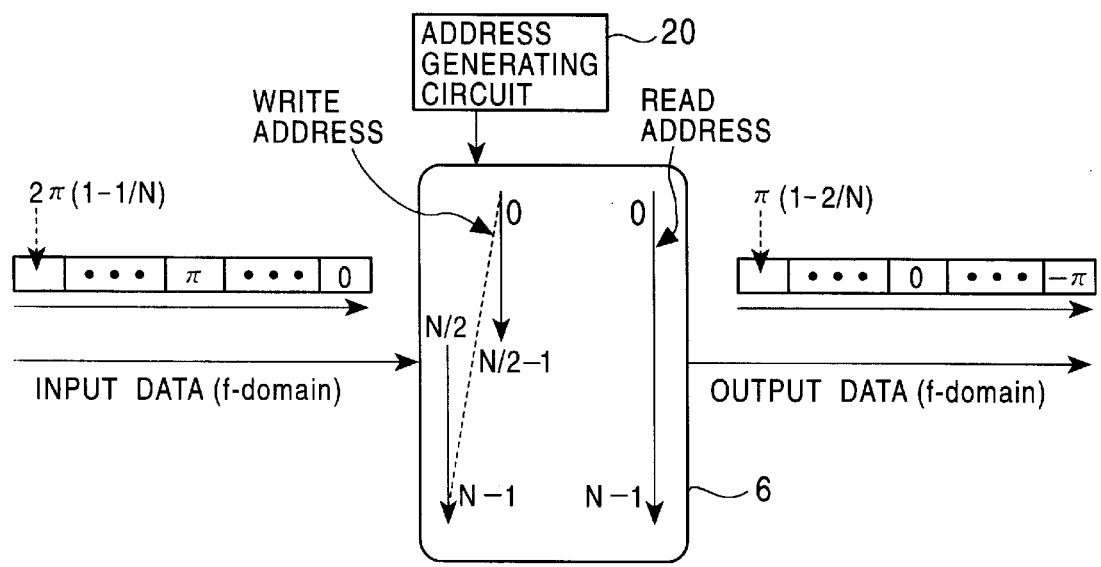

Likewise, in the input buffer memory 2, the write address (sttadr) is set to be (N/2), as shown in FIG. 5B. In a manner similar to the above-described operation of the output buffer memory 6, data items are sequentially written into the write addresses from (N/2) to (N−1) and from 0 to (N/2−1) in the input buffer memory 2. Then, the data items are read from the addresses from 0 to (N−1).

Figure 7:
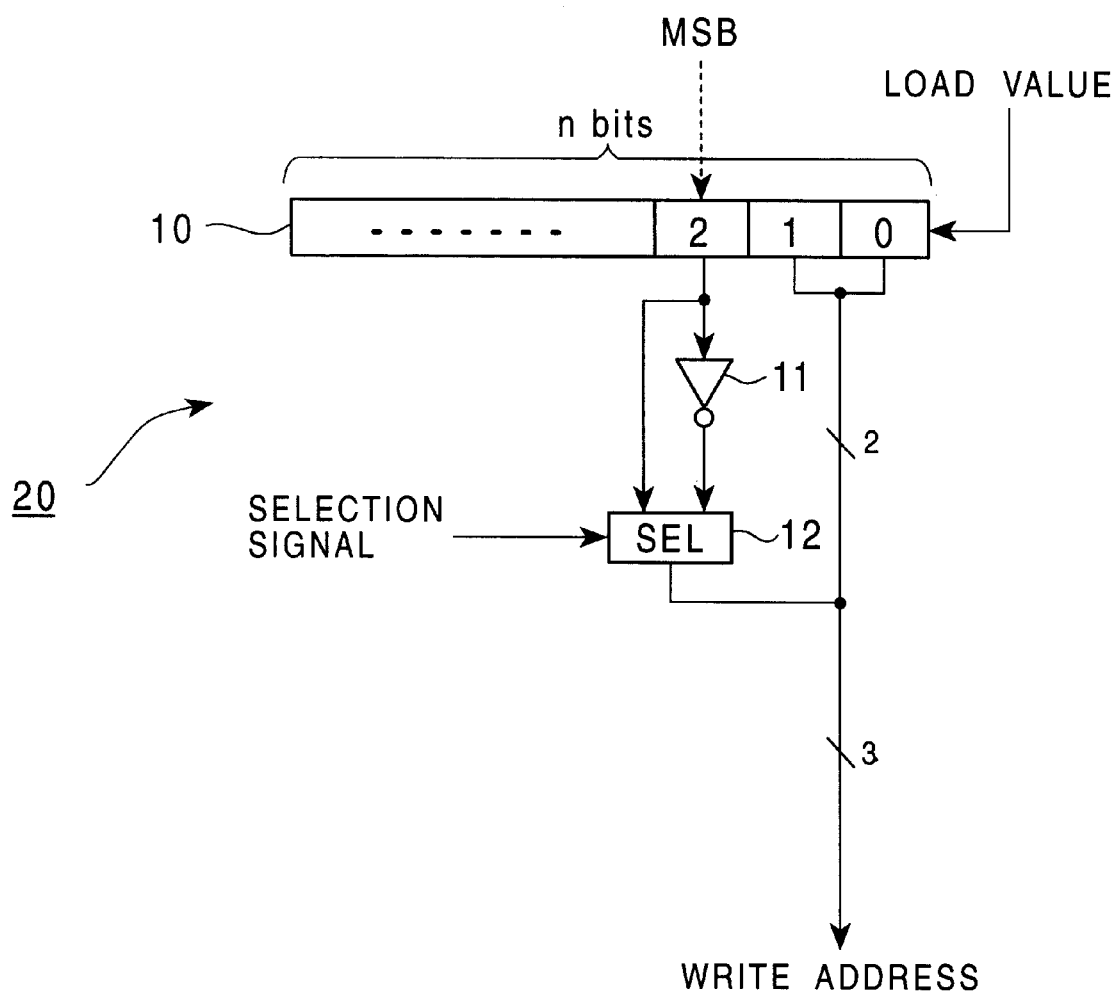
FIG. 7 illustrates the configuration of another example of an address generating circuit for use in the input buffer memory shown in FIG. 2 or the output buffer memory shown in FIG. 3.

The operation of the address generating circuit 20 is now described with reference to FIGS. 7 and 8. The address generating circuit 20 illustrated in FIG. 7 is basically configured similarly to the counterpart shown in FIG. 4. However, the address generating circuit 20 shown in FIG. 7 uses a 3-bit counter 10. In response to an input of a load value (000), the counter 10 loads the value (000) and starts counting in synchronization with the data input into the output buffer memory 6. The counter 10 sequentially counts from 0 to 7, as illustrated in FIG. 9. During each counting operation, the counter 10 divides the count level into the MSB and the remaining bits and outputs them. The MSB is supplied to a selector 12 and a NOT circuit 11. The NOT circuit 11 inverts the MSB and supplies it to the selector 12.

Figure 8:
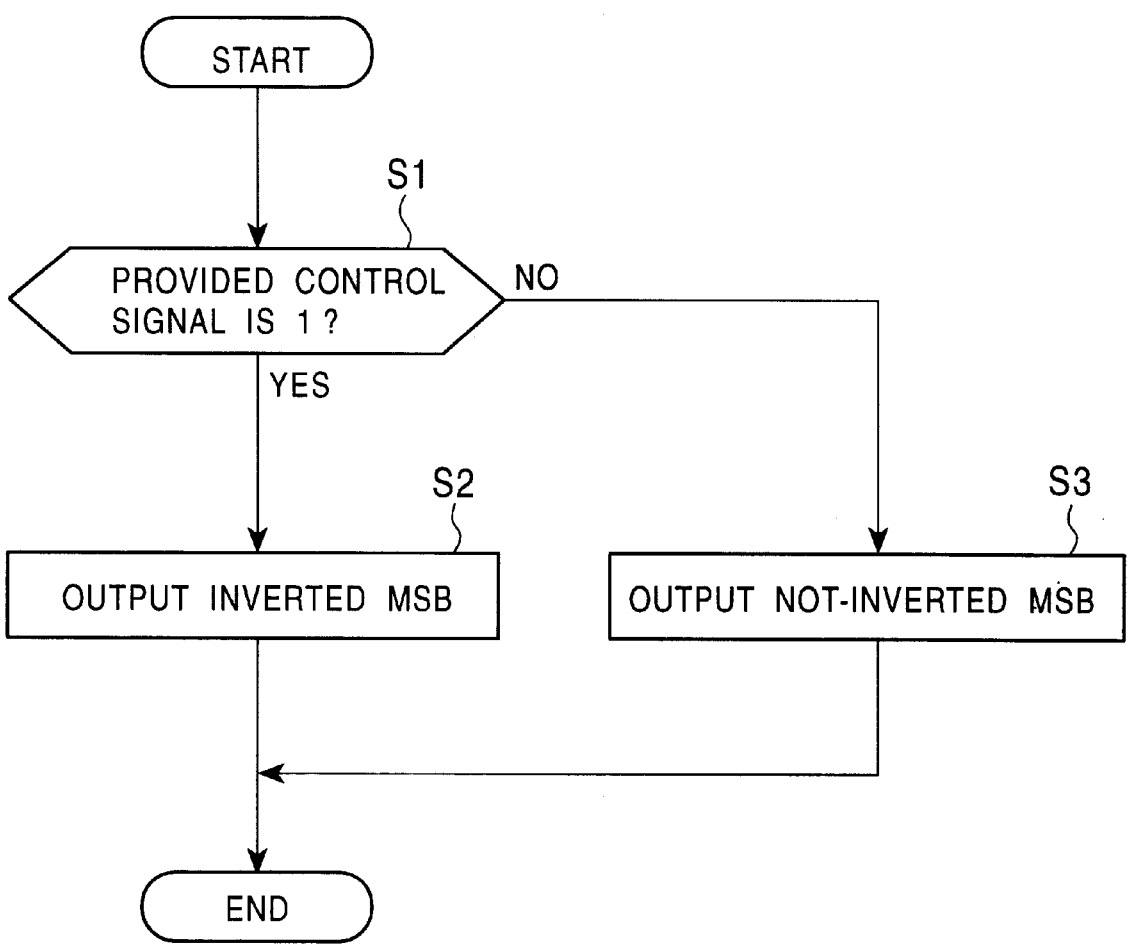
FIG. 8 is a flow chart illustrating the operation of the selector shown in FIGS. 4 and 7.
Figure 9:
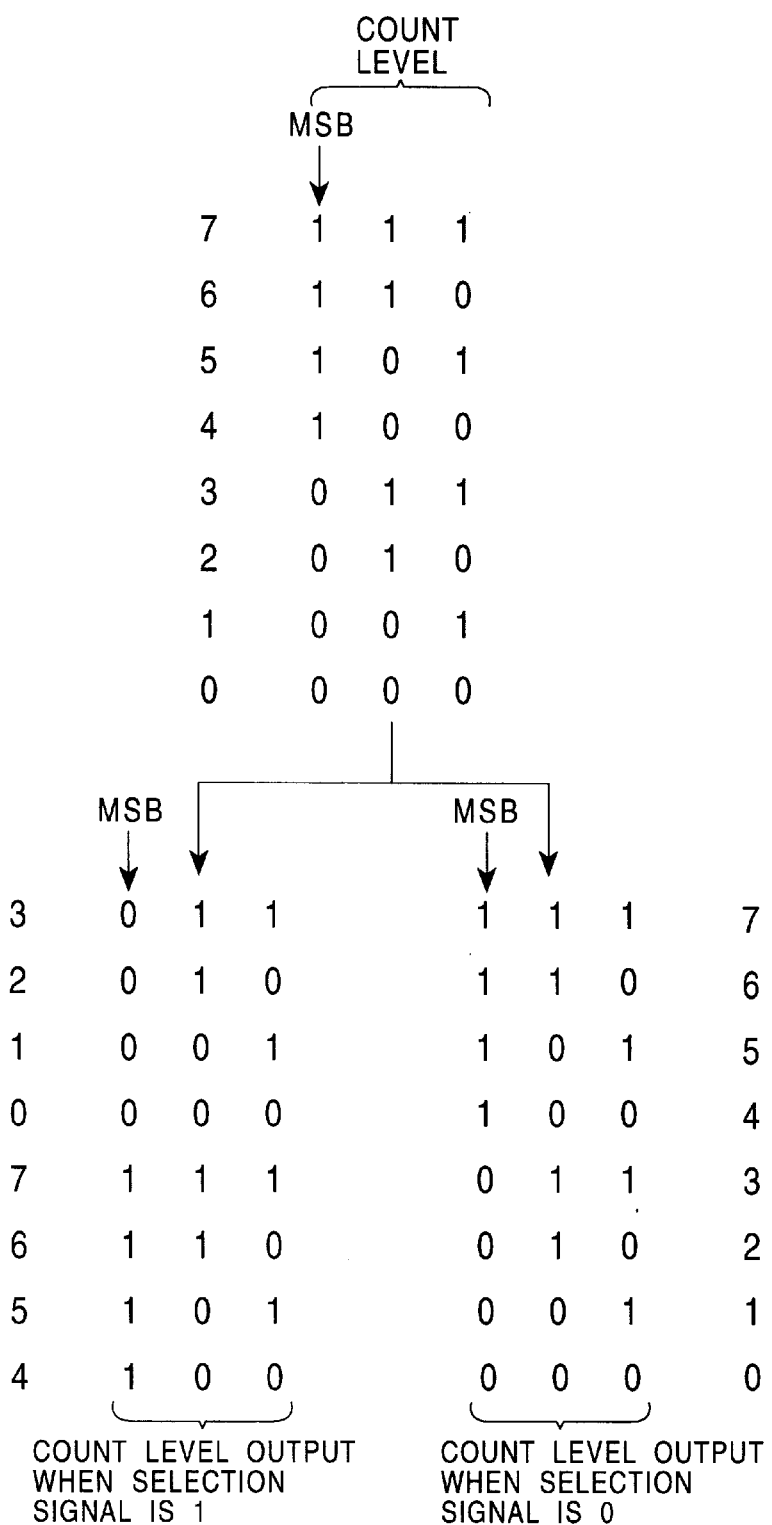
FIG. 9 illustrates the operation of the address generating circuit shown in FIGS. 4 and 7.
Figure 10:
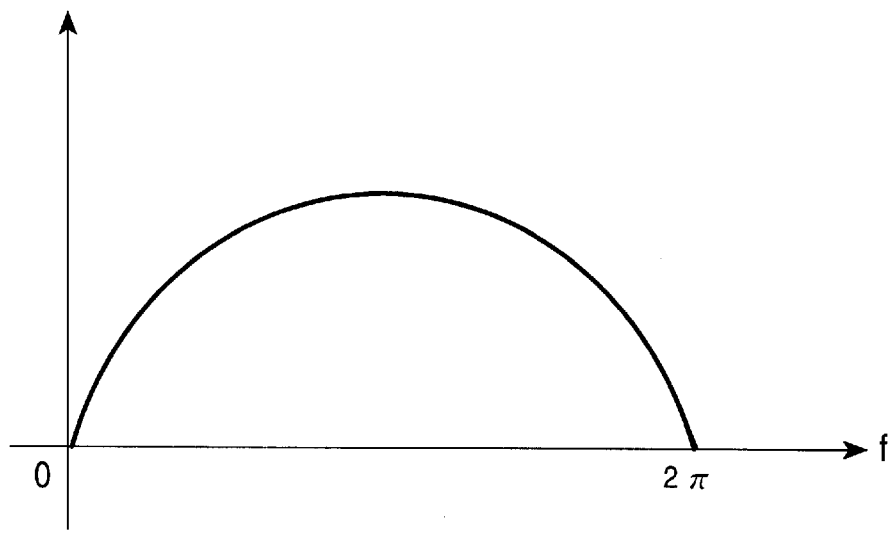
FIG. 10 illustrates a signal spectrum obtained by the OFDM method used in DAB.
Figure 11:
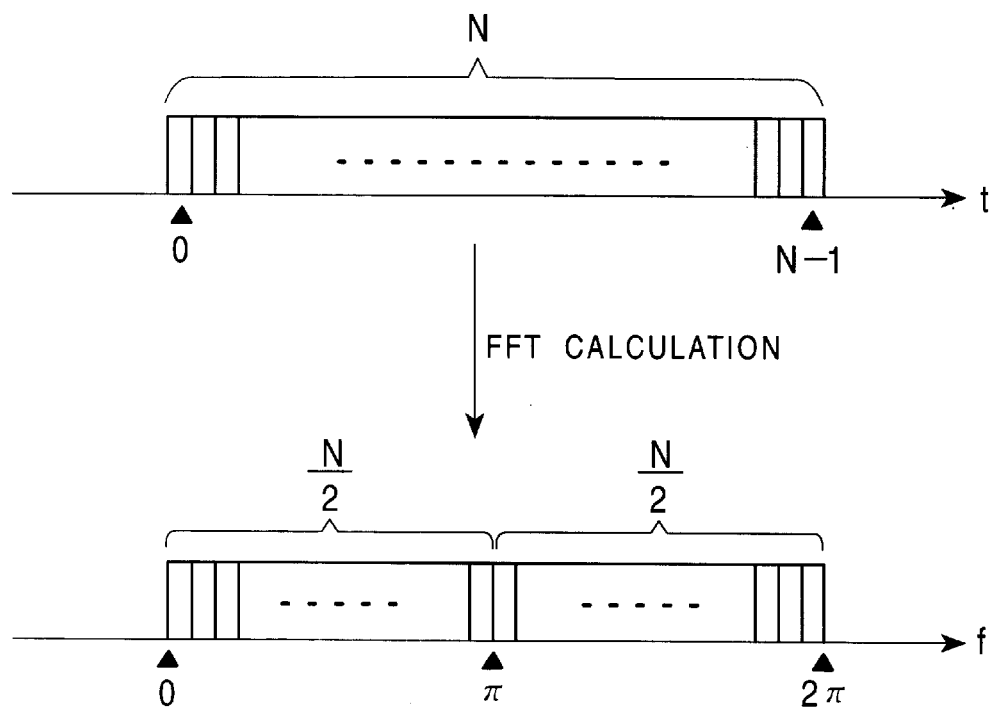
FIG. 11 illustrates an example of the relationship between the input data and the output data of a FFT calculating apparatus.
Figure 12:
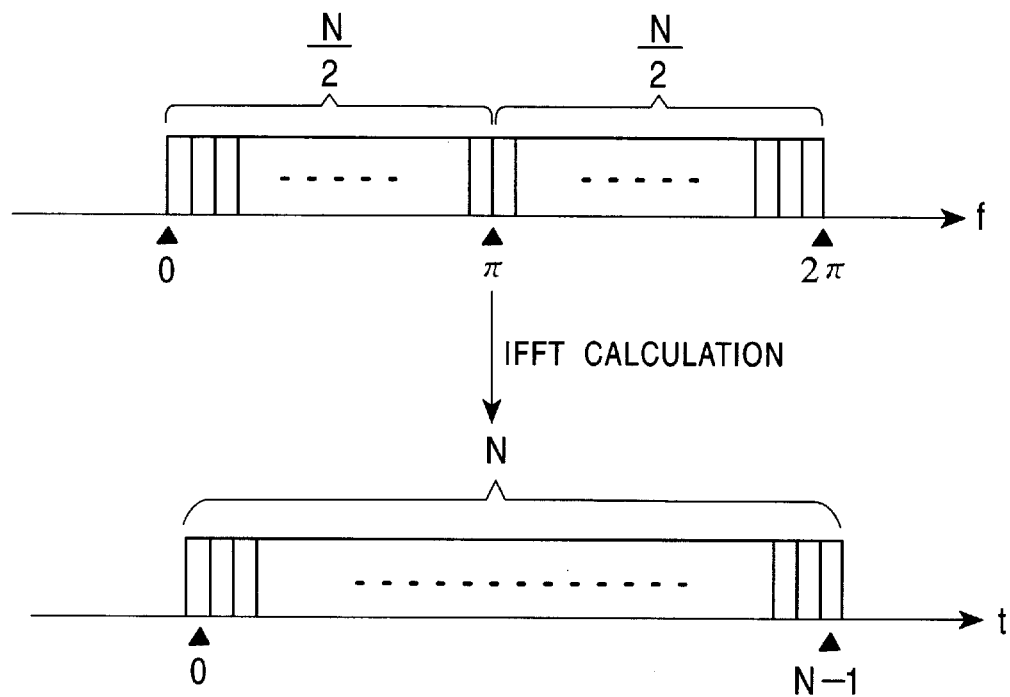
FIG. 12 illustrates an example of the relationship between the input data and the output data of an IFFT calculating apparatus.
Figure 13:
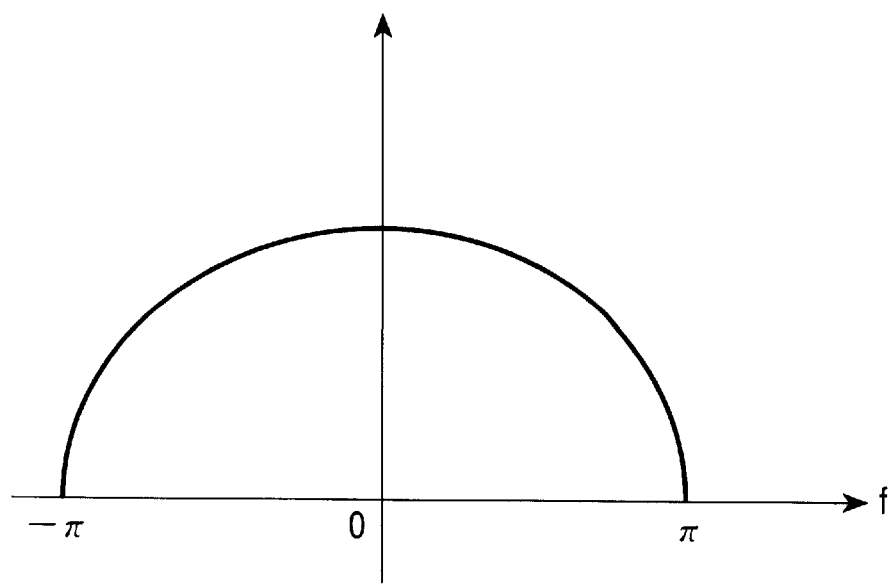
FIG. 13 illustrates a signal spectrum obtained by the OFDM method used in DVB-T.
Figure 14:
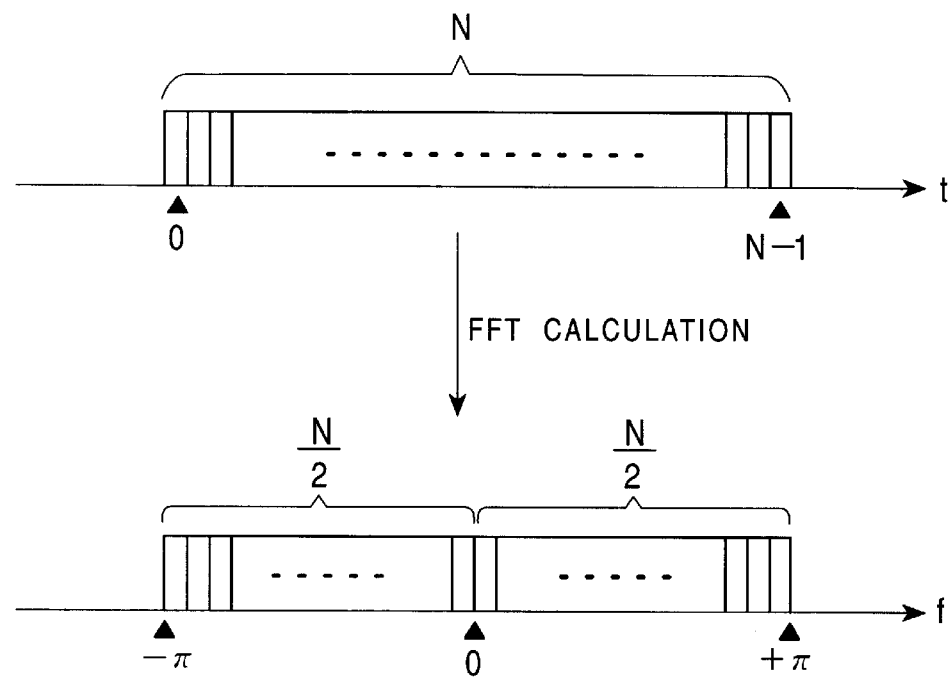
FIG. 14 illustrates another example of the relationship between the input data and the output data of a FFT calculating apparatus.
Figure 15:
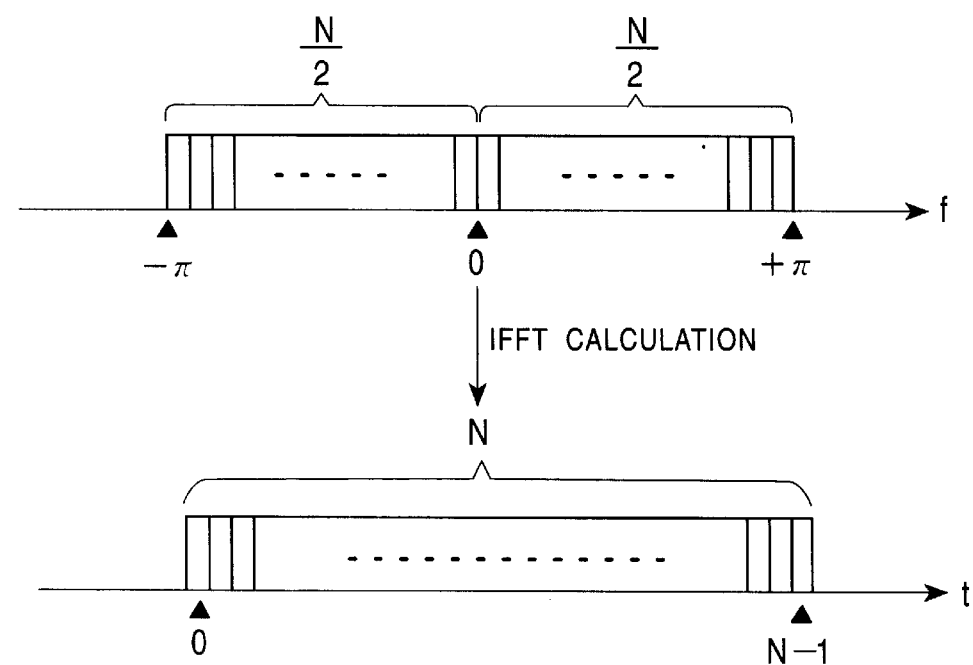
FIG. 15 illustrates another example of the relationship between the input data and the output data of an IFFT calculating apparatus.

FIG. 8 is a flow chart illustrating the operation of the selector 12. In step S1, the selector 12 determines whether a control signal supplied from an exterior source is 1. If the answer of step S1 is yes, the process proceeds to step S2 in which the selector 12 outputs the MSB inverted by the NOT circuit 11. If the selector 12 finds in step S1 that the supplied control signal is not 1 (i.e., is 0), the process proceeds to step S3 in which the selector 12 outputs the not-inverted MSB directly supplied from the counter 10.

Then, the MSB (one bit) output from the selector 12 and the remaining two bits output from the counter 10 are output from the address generating circuit 20 as a total of a 3-bit address. According to the above-described operation, when the selection signal 1 is supplied to the selector 12, the count levels are sequentially output from 4 to 7 and from 0 to 3 (decimal), as indicated by the lower left portion of FIG. 9. Conversely, when the selection signal 0 is supplied to the selector 12, the count levels are sequentially output from 0 to 7, as represented by the lower right portion of FIG. 9.

In accordance with the order of count levels which is output as the order of write addresses, the data is written into the output buffer memory 6.

As is seen from the foregoing description, the calculating apparatus and the calculating method of the present invention offers the following advantages. The order of writing data items or the order of reading data items into the input buffer memory or the output buffer memory can be set. Hence, it is possible to convert the frequency domain of the output data or the frequency domain of the input data of the calculating apparatus without requiring the use of an external circuit.

What is claimed is:

1. A calculating apparatus, comprising:
 a first storage unit operable to store initial data inputted from an external source;
 a calculating unit operable to perform butterfly calculations;
 a second storage unit operable to store intermediate data used by said calculating unit to perform said calculations;
 a third storage unit operable to store processed data calculated by said calculating unit and to output said processed data to an external device; and
 a setting unit operable to set the order of write addresses or read addresses of said initial or processed data, said setting unit including
 a counting unit operable to count clocks in synchronization with said initial or processed data to obtain a count level;
 an inversion unit operable to invert the most significant bit of said count level; and
 a selection unit operable to determine whether to output the most significant bit or the inverted most significant bit.

2. A calculating apparatus according to claim 1, wherein said calculating apparatus comprises a fast Fourier transform calculating apparatus.

3. A calculating apparatus according to claim 1, wherein said calculating apparatus comprises an inverse fast Fourier transform calculating apparatus.

4. A calculating apparatus, comprising:
 a first storage unit operable to store initial data inputted from an external source;
 a calculating unit operable to perform butterfly calculations;
 a second storage unit operable to store intermediate data used by said calculating unit to perform said calculations;
 a third storage unit operable to store processed data calculated by said calculating unit and to output said processed data to an external device;
 a setting unit operable to set the order of write addresses or read addresses of said initial or processed data;
 wherein said setting unit sets the order of the addresses in such a manner that the frequency domain of said initial or processed data is converted into another frequency domain.

5. A calculating method, comprising:
 storing initial data inputted from an external source;
 performing butterfly calculations using said initial data to produce processed data;
 storing intermediate data used for performing said butterfly calculations;
 storing said processed data for output to an external device;
 setting the order of write addresses or read addresses of said initial or processed data, said setting step including counting clocks in synchronization with said storing of initial data or said storing of processed data to obtain a count level;

inverting the most significant bit of said count level; and determining whether to output the most significant bit or the inverted most significant bit.

6. A calculating method according to claim 5, wherein said calculating method performs a fast Fourier transform calculation.

7. A calculating method according to claim 5, wherein said calculating method performs an inverse fast Fourier transform calculation.

8. A calculating method, comprising:

storing initial data inputted from an external source;

performing butterfly calculations using said initial data to produce processed data;

storing intermediate data used for performing said butterfly calculations;

storing said processed data for output to an external device; and setting he order of write addresses or read addresses of said initial or processed data, wherein said setting step sets the order of the addresses in such a manner that the frequency domain of said initial or processed data is converted into another frequency domain.

* * * * *

UNITED STATES PATENT AND TRADEMARK OFFICE
CERTIFICATE OF CORRECTION

PATENT NO.    : 6,263,356 B1                                   Page 1 of 1
DATED         : July 17, 2001
INVENTOR(S)   : Kozaki et al.

It is certified that error appears in the above-identified patent and that said Letters Patent is hereby corrected as shown below:

Column 10,
Line 9, "he" should read -- the --.

Signed and Sealed this

Twenty-seventh Day of May, 2003

JAMES E. ROGAN
*Director of the United States Patent and Trademark Office*